United States Patent

[11] 3,621,006

[72] Inventors Marcel Georges Jirou;
 Claude Marie Henri Emile Brouard, both of Sotteville-les-Rouen, France
[21] Appl. No. 715,456
[22] Filed Feb. 20, 1968
[45] Patented Nov. 16, 1971
[73] Assignee Ugine Kuhlmann
 Paris, France
[32] Priority Feb. 10, 1967
[33] France
[31] 94405

[54] MIXED CHROMIUM MONOAZO DYE COMPLEXES
 3 Claims, No Drawings
[52] U.S. Cl.................................................. 260/145 B,
 260/147, 260/163, 8/13, 8/54, 8/178
[51] Int. Cl..................................................... C09b 45/16,
 D06p 1/02
[50] Field of Search....................................... 260/145

[56] References Cited
 UNITED STATES PATENTS
 3,041,327 6/1962 Buehler et al................. 260/145

*Primary Examiner*—Charles B. Parker
*Assistant Examiner*—Donald M. Papuga
*Attorney*—Beveridge & De Grandi ABSTRACT: Mixed chromium complexes are provided of the type
(I)—Cr—(II)
wherein (I) represents the residue of a mono-azo dye of the general formula:

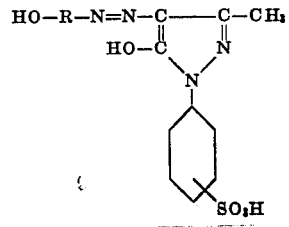

wherein R represents an o-arylene nucleus and (II) represents the residue of a mono-azo dye of the general formula:

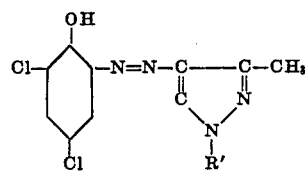

wherein R' represents a benzene nucleus.
These complexes are suitable for coloring textile fibers.

MIXED CHROMIUM MONOAZO DYE COMPLEXES

The present invention concerns new metal complexes represented by the following formula:

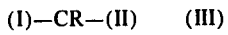

wherein (I) represents the residue of a monoazo dye of the following general formula:

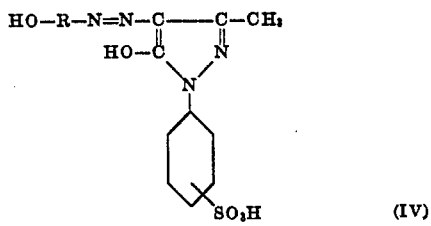

wherein R represents an o-arylene nucleus, possibly substituted by at least one nonwater-solubilizing substituent and (II) represents the residue of a monoazo dye of the general formula:

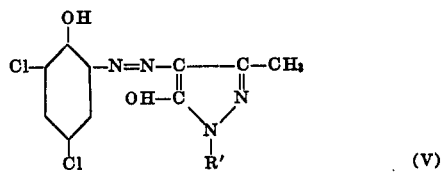

wherein R' represents a benzene nucleus, possibly substituted by at least one nonwater-solubilizing substituent. As nonwater-solubilizing substituents one may mention for example halogen atoms and alkyl and nitro groups.

The monoazo dyes of formulas (IV) and (V) required for the preparation of the complexes in accordance with the invention may be obtained in a known manner for example by coupling in alkaline medium of diazo derivatives of o-amino phenols with pyrazolone coupling compounds. As examples of o-amino phenols of the residue R the following may be mentioned: 4-chloro-1-hydroxy-2-aminobenzene, 4,6-dichloro-1-hydroxy-2-aminobenzene, 4- or 5-nitro-1-hydroxy-2-aminobenzene, 4,6-dinitro-1-hydroxy-2-aminobenzene and 4-methyl-6-nitro-1-hydroxy-2-aminobenzene.

The mixed complexes of formula (III) can be obtained for example by reacting in aqueous alkaline medium, a chromium complex of an aliphatic or aromatic o-hydroxy carboxylic acid, such as salicylic acid or tartaric acid, on an approximately equimolecular mixture of dyes of the formula (IV) and (V); these complexes may also be obtained advantageously by reacting in aqueous alkaline medium a 1/1 chromium complex of a dye of formula (IV) with a dye of formula (V).

The mixed complexes in accordance with the invention are particularly suitable for the dyeing, preferably in the presence of a weak organic acid for example in an acetic acid medium, of animal fibers such as silk, leather, wool and of synthetic fibers based on polyamides or polyurethanes, as well as mixed fibers, for example of wool and superpolyamides. The shades obtained present a combination of good fastness to rubbing, to moisture tests and excellent light fastness.

In the following examples which illustrate the present invention without limiting it the parts are by weight.

EXAMPLE 1

In 1000 parts of water 45.25 parts of the chromium complex of [4-chloro-1-hydroxybenzene]-<2 azo 4>-[4'-sulpho-1-phenyl-3-methyl-5-hydroxypyrazole] containing one atom of chromium per molecule of monoazo dye, is mixed with 36 parts of 3',5'-dichloro-2'-hydroxy-4-phenylazo-1-phenyl-3-methyl-5-pyrazolone. The mixture is heated to 90°–100° C. and caustic soda is added so that the pH remains between 7 and 8. When the monoazo dye has disappeared the pH is raised to 9.5, then the mixed chromium dye is precipitated by the addition of sodium chloride and dried. It dyes wool and polyamide fibers with a red color of very good general fastness. The mixtures of these two fibers present no differences in shades.

EXAMPLE 2

In 1000 parts of water 45.25 parts of the chromium complex of [4-chloro-1-hydroxy benzene]-<2 azo 4>-[3'-sulpho-1-phenyl-3-methyl-5hydroxypyrazole] containing one atom of chromium per molecule of monoazo dye is mixed with 36 parts of 3', 5'-dichloro-2'-hydroxy-4-phenylazo-1-phenyl-3-methyl-5pyrazolone The mixture is heated to 90°–200° C. and caustic soda is added so that the pH remains between 7 and 8. When the monoazo dye has disappeared the pH is raised to 9.5 and then the mixed chromium dye is precipitated by the addition of sodium chloride and dried. It dyes wool and polyamide fibers with a red color of very good general fastness. The mixtures of these two fibers present no differences of shades.

We claim:

1. Chromium complex compound which contains one atom of chromium bound in complex union to one molecule of a monoazo dyestuff of the formula:

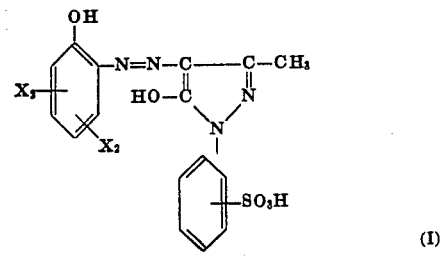

wherein $X_1$ is chlorine or nitro and $X_2$ is hydrogen, chlorine, nitro or methyl, and to one molecule of the monoazo dyestuff of the formula:

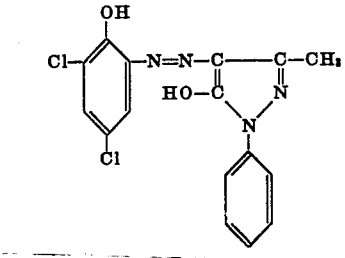

2. A chromium complex compound according to claim 1 wherein the monoazo dyestuff of the formula (I) is [4-chloro-1-hydroxybenzene]-<2 azo 4>-[4'-sulpho-1-phenyl-3-methyl-5-hydroxypyrazole].

3. A chromium complex compound according to claim 1 wherein the monoazo dyestuff of the formula (I) is [4-chloro-1-hydroxybenzene]-<2 azo 4>-[3'-sulpho-1-phenyl-3-methyl-5-hydroxypyrazole].

4. Complex according to claim 1 wherein (I) represents the residue of [4-chloro-1-hydroxybenzene]-<2 azo 4>-[4'sulpho-1-phenyl-3-methyl-5-hydroxypyrazole] and (II) represents the residue of 3',5'-dichloro-2'-hydroxy-4-phenylazo-1-phenyl-3-methyl-5-pyrazolone Complex according to claim 1 wherein (I) represents the ue of [4-chloro-1-hydroxybenzene]-<2 azo 4>-[3'-io-1-phenyl -3-methyl-5hydroxy-pyrazole] and (II) sents the residue of 3',5'-dichloro-2'-hydroxy-4-phen--1-phenyl-3-methyl-5-pyrazolone.

* * * * *

UNITED STATES PATENT OFFICE
CERTIFICATE OF CORRECTION

Patent No. 3,621,006           Dated November 16, 1971

Inventor(s) M G. Jirou et al.

It is certified that error appears in the above-identified patent and that said Letters Patent are hereby corrected as shown below:

Cancel claims 4 and 5.

Claims 4 and 5 in this patent were cancelled during the prosecution of the application on which this patent issued. Claims 4 and 5 do not form a part of this grant of Letters Patent.

Signed and sealed this 30th day of May 1972.

(SEAL)
Attest:

EDWARD M. FLETCHER, JR.        ROBERT GOTTSCHALK
Attesting Officer               Commissioner of Patents